United States Patent [19]

Ilcisin et al.

[11] Patent Number: 5,414,440

[45] Date of Patent: May 9, 1995

[54] ELECTRO-OPTICAL ADDRESSING STRUCTURE HAVING REDUCED SENSITIVITY TO CROSS TALK

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 263,166

[22] Filed: Jun. 21, 1994

Related U.S. Application Data

[63] Continuation of Ser. No. 26,367, Mar. 4, 1993, abandoned.

[51] Int. Cl.⁶ .............................................. G09G 3/36
[52] U.S. Cl. .................................... 345/58; 345/87; 345/60; 345/100
[58] Field of Search ............... 345/58, 60, 87, 92, 345/100, 94; 359/54, 102, 55

[56] References Cited

U.S. PATENT DOCUMENTS

| | | | |
|---|---|---|---|
| 3,955,187 | 5/1976 | Bigelow | 345/58 |
| 3,995,942 | 12/1976 | Kawakami et al. | 345/94 |
| 4,485,380 | 11/1984 | Soneda et al. | 345/58 |
| 4,845,482 | 7/1989 | Howard | 345/58 |
| 4,892,389 | 1/1990 | Kuijk | 359/55 |
| 4,896,149 | 1/1990 | Buzak et al. | 345/60 |
| 4,945,352 | 7/1990 | Ejiri | 345/58 |
| 5,221,979 | 6/1993 | Kim | 345/60 |

OTHER PUBLICATIONS

Casio Computer Co., document number 0312982 dated Oct. 19, 1987.
IBM Co., document number 0313876 dated Oct. 3, 1988.

Primary Examiner—Alvin E. Oberley
Assistant Examiner—Vivian W. Chang
Attorney, Agent, or Firm—Michael O. Scheinberg; Richard B. Preiss; John D. Winkelman

[57] ABSTRACT

A plasma addressed liquid crystal display (10) uses a liquid crystal material (18) having a low $\Delta\epsilon$, $\epsilon_\perp$, and $\Delta n$, resulting in reduced sensitivity to cross talk, reduced operating voltage, and improved resistance to the deleterious electrochemical effects of direct current biases. Liquid crystal layers of low $\Delta\epsilon$, $\epsilon_\perp$, and $\Delta n$ materials exhibit lower capacitance, which increases the threshold voltage and reduces the saturation voltage to achieve reduced sensitivity to crosstalk and a lower operating voltage.

14 Claims, 8 Drawing Sheets

ELECTRO-OPTICAL ADDRESSING STRUCTURE HAVING REDUCED SENSITIVITY TO CROSS TALK

This is a continuation of application Ser. No. 08/026,367, filed Mar. 4, 1993, which is now abandoned.

TECHNICAL FIELD

The present invention relates to electro-optical addressing structures having multiple address locations arranged in an array and, in particular, to a method and an apparatus for reducing the effects of incidental data propagation or cross talk among the address locations.

BACKGROUND OF THE INVENTION

Electro-optical addressing structures are employed in a variety of applications including video cameras, data storage devices, and flat panel liquid crystal displays. Such addressing structures typically include very large numbers of address locations arranged in an array. For example, a flat panel liquid crystal display configured in accordance with a high-definition television format would typically include at least two million address locations. The address locations would correspond to display elements or pixels that are arranged in about 1,000 lines with about 2,000 pixels each.

One object in the design of liquid crystal displays is to minimize cross talk. Adjacent pixels in such a display are closely spaced and have incidental capacitive couplings resulting from these small spacings. Such coupling between adjacent pixels will be referred to as "side-to-side" coupling. In addition, during operation of electro-optical addressing structures, the data drive signals for all the pixels in a column are typically carried on a common conductor adjacent to the pixels. The electrical properties of the electro-optical addressing structures result in capacitive coupling among all the pixels in the column or row. Such coupling among all pixels in a column or row will be referred to as "front-to-back" coupling. A third type of crosstalk, known as "horizontal crosstalk," occurs in a plasma addressed display and is caused by one of the plasma forming electrodes being maintained at a floating potential. Horizontal crosstalk can be eliminated by connecting the floating electrode to a reference electrode, as described in my concurrently filed, copending patent application for "Electrode Shunt in Plasma Channel" of Ilcisin, which is assigned to the assignee of the present invention. These three types of crosstalk cause the data drive signal directed to a particular pixel to be carried to other pixels as incidental data signals or cross talk. For a display system, the cross talk is image dependent, i.e., it depends on the data drive signals present on the conductors and changes the voltage across a specific pixel. Cross talk effects include an unpredictable gray scale that limits the number of achievable gray levels below the number necessary for acceptable video performance. A gray level is sensitive to small variations in the root means square average voltage ("RMS") across a display element, and the cross talk changes that voltage. It will be appreciated that "gray scale" in this context refers to the range of available light output levels in either monochrome or color display systems.

One type of addressing structure is a plasma addressed liquid crystal ("PALC") display described in U.S. Pat. No. 4,896,149 of Buzak et al. for "Addressing Structure Using Ionizable Gaseous Medium," which is assigned to the assignee of the present application. A PALC display places a voltage related to a desired gray level onto a data electrode on one side of a pixel, while ionized gas in a plasma channel provides an electrical path to a reference electrode on the opposite side of the pixel. The voltage remains stored across the pixel when the plasma is extinguished, and the path to ground is eliminated. A PALC display tends to be sensitive to side-to-side cross talk because of the relatively large distance from the data electrode to the reference electrode within the plasma channel. A PALC display also requires the use of higher drive voltages than some other types of display, because the physical components of the display divide the voltage placed on the data electrode, resulting in only a portion of the applied voltage being stored across the liquid crystal to probe the desired gray scale. Higher drive voltages necessitate data drivers having a greater dynamic range and increases the voltage gradient between adjacent pixels in different optical states, thereby exacerbating crosstalk.

Most methods of reducing cross talk in liquid crystal displays entail modifying the data signals in a manner that reduces the incidental signals. One such method is described in U.S. patent application Ser. No. 07/958,631 of Ilcisin et al. for "Adaptive Drive Waveform for Reducing Cross Talk Effects in Electro-Optical Addressing Structures," (hereafter referred to as the "Adaptive Drive Waveform") which is assigned to the assignee of the present invention. Another method for reducing cross talk by varying the addressing signals is described in U.S. Pat. No. 4,845,482 of Howard et al. for "Method for Eliminating Crosstalk in a Thin Film Transistor/Liquid Crystal Display," All such addressing methods also strive to eliminate any direct current bias across the liquid crystal. Direct current biases electrochemically degrade the liquid crystal, resulting in poor image quality.

Cross talk may also be reduced, as described in U.S. patent application Ser. No. 07/854,145 of Buzak for "Reducing Cross Talk Effects in Electro-optical Addressing Structures," which is assigned to the assignee of the present application. The Buzak application describes using a two-phase addressing method in conjunction with a liquid crystal material that is insensitive to voltages at the high frequency of the two-phase signals. Such frequency-sensitive liquid crystals are not, however, suitable for all applications.

Another object in the design of liquid crystal displays is to minimize the voltage requirements. A known method of reducing voltage requirements is to use a liquid crystal material having low threshold voltage, that is, a liquid crystal that begins to change its optical state at a low voltage. A liquid crystal having a low threshold also typically has a low saturation voltage, i.e., a low voltage at which the crystal is considered to be in an "ON" state. The threshold voltage is related to the dielectric properties of the liquid crystal molecules. Most liquid crystal molecules exhibit dielectric anisotropy, that is, the permissivity or dielectric constant ("$\epsilon$") is different along different molecular axes. The time average direction of the long molecular axis is known as the "director." The dielectric anisotropy ("$\Delta\epsilon$") is defined as the difference between the dielectric constant parallel to the director ("$\epsilon_{\parallel}$") and the dielectric constant perpendicular ("$\epsilon_{195}$") to the director. Modern liquid crystal display panels typically use liquid crystals having positive dielectric anisotropy, that is, the stronger dipole of the liquid crystal molecules are aligned with the long axis of the molecule.

In the absence of an electric field, liquid crystal molecules typically maintain an orientation determined by the liquid crystal itself, the cell geometry, and the alignment layers. When a voltage applied across the liquid crystal cell produces an electric field exceeding the threshold voltage, the orientation of the liquid crystal molecules and, therefore, the optical transmission properties of the liquid crystal, begin to change. The threshold voltage of a liquid crystal cell varies inversely with the square root of the dielectric anisotropy, $\Delta\epsilon$, of the liquid crystal material. To reduce the voltage requirements of a display, display designers typically select a liquid crystal material having a large $\Delta\epsilon$ to reduce the threshold voltage.

SUMMARY OF THE INVENTION

An object of the present invention is, therefore, to provide a method and an apparatus for reducing cross talk effects in electro-optical addressing structures.

Another object of this invention is to provide such a method and apparatus that are effective with any active-matrix electro-optical addressing structure.

A further object of this invention is to provide such a method and apparatus that can be used together with cross talk reducing addressing schemes.

Yet another object of this invention is to provide such a method and apparatus that use a lower operating voltage.

Still another object of this invention is to provide such a method that simultaneously increases the threshold voltage and reduces the voltage gradient between pixels.

Yet another object of this invention is to provide such a method and apparatus that are resistant to the image-degrading effects of a direct current bias.

The present invention is a method and an apparatus for reducing the effects of cross talk in any active-matrix type of electro-optical addressing structures employed in, for instance, flat panel display systems. The material of the present invention reduces crosstalk effects by increasing the threshold voltage and reducing the difference between the threshold and saturation voltages. Reducing the difference between the threshold and saturation voltages also reduces the dynamic voltage range requirement for the data drivers.

An active-matrix type of electro-optical addressing structure typically includes an addressing structure for addressing and delivering data drive signals to each of multiple address locations arranged in an array, each address location corresponding to a display element or pixel. Groups of display elements have incidental capacitive couplings that carry noise in the form of incidental data signals or cross talk.

All display elements in a column of the array are typically connected to one data drive electrode, and all display elements in a row are connected to one data strobe electrode. A data driver applies information in the form of an analog data drive signal onto each data drive electrode during a row address period. The data drive signal has a voltage of changing magnitude that causes a desired gray level for each display element in the row addressed. A data strobe signal applied to the data strobe electrode for that row activates the data storage. Since only one row receives the data strobe signal, the display elements in other rows, although connected to the same data drive electrodes, do not store the data drive signal.

The present invention uses a liquid crystal material having a threshold voltage higher than the voltage value of many of the incidental data signals. Because the threshold voltage is inversely proportional to the square root of the anisotropy, a low $\Delta\epsilon$ material is used to increase the threshold voltage relative to the high $\Delta\epsilon$ materials commonly used in prior art liquid crystal displays. The materials used in the present invention are, therefore, less sensitive to changes in optical state caused by incidental cross talk voltages.

The present invention can be used in conjunction with addressing schemes, such as the Adaptive Drive Waveform, that reduce the voltage level of incidental cross talk. Using an addressing scheme that reduces the voltage level of cross talk signals together with the present invention that decreases both the voltage gradient between pixels and the optical effects of the remaining cross talk signals achieves a great improvement in image quality.

The present invention also reduces the voltage requirements of a PALC display. In a PALC display, the voltage of the data drive signal, "$V_{DATA}$", is divided among a liquid crystal material, a thin dielectric, and a discharged plasma channel. The optical properties of the liquid crystal, however, depend only on the voltage across the liquid crystal, "$V_{LC}$", which is related to by $V_{DATA}$ by:

$$V_{LC} \approx C_{TD}/(C_{TD}+C_{LC}) \times V_{DATA} \qquad \text{Eq. 1}$$

where $C_{TD}$ and $C_{LC}$ are the capacitances of the thin dielectric and the liquid crystal layer, respectively. The fraction of the applied data drive voltage $V_{DATA}$ that is stored across the liquid crystal is, therefore, inversely and nonlinearly related to its capacitance. The capacitance is proportional to the $\Delta\epsilon$ and $\epsilon_{195}$ of the liquid crystal and inversely proportional to the thickness, "d", of the liquid crystal layer. The thickness d is inversely proportional to the optical anisotropy, "$\Delta n$", of the liquid crystal. Therefore, smaller values of $\Delta\epsilon$ and $\epsilon_\perp$ and larger values of $\Delta n$ result in a larger portion of the data drive voltage being stored across the liquid crystal.

Because of the dielectric anisotropy, the capacitance of a liquid crystal layer also depends upon the orientation of the molecules in the layer. As the voltage across the liquid crystal layer increases above the threshold voltage, the molecules of the liquid crystal align to a greater degree with the applied electric field, and the capacitance increases nonlinearly. Because of this increase in capacitance, a smaller fraction of the applied drive voltage is stored across the liquid crystal as the data drive voltage increases. This decrease in the fraction of the data drive voltage stored across the liquid crystal results in a higher voltage being required to saturate the display. The higher saturation voltage results in larger voltage gradients between display elements that are saturated and display elements in an OFF state, thereby exacerbating side-to-side crosstalk. The higher saturation voltage also increases the required dynamic range of the data drivers, i.e., the range of $V_{DATA}$ between threshold and saturation.

To minimize the saturation voltage, the invention reduces the capacitance of the liquid crystal by using a material having low $\Delta\epsilon$ and $\epsilon_\perp$. The low $\Delta\epsilon$ and $\epsilon_\perp$ material used also has a low $\Delta n$ that maximizes the optimum liquid crystal layer thickness for display operation in a first order minimum condition without adversely affecting switching speed. The invention, therefore, reduces the maximum voltage and voltage range required to drive the liquid crystal display. This voltage reduction is particularly beneficial in a PALC display, which uses relatively high operating voltages because of the voltage dividing effects of the display structure.

Furthermore, the low $\Delta\epsilon$ and $\epsilon_\perp$ material dissolves ions from organic alignment coatings less readily than do high $\Delta\epsilon$ materials. Therefore, the low $\Delta\epsilon$ and $\epsilon_\perp$ materials exhibit higher resistivity, which reduces susceptibility to image degradation caused by a direct current bias.

Additional objects and advantages of the present invention will be apparent from the following detailed description of a preferred embodiment thereof, which proceeds with reference to the accompanying drawings.

DETAILED DESCRIPTION OF A PREFERRED EMBODIMENT

Figure 1:
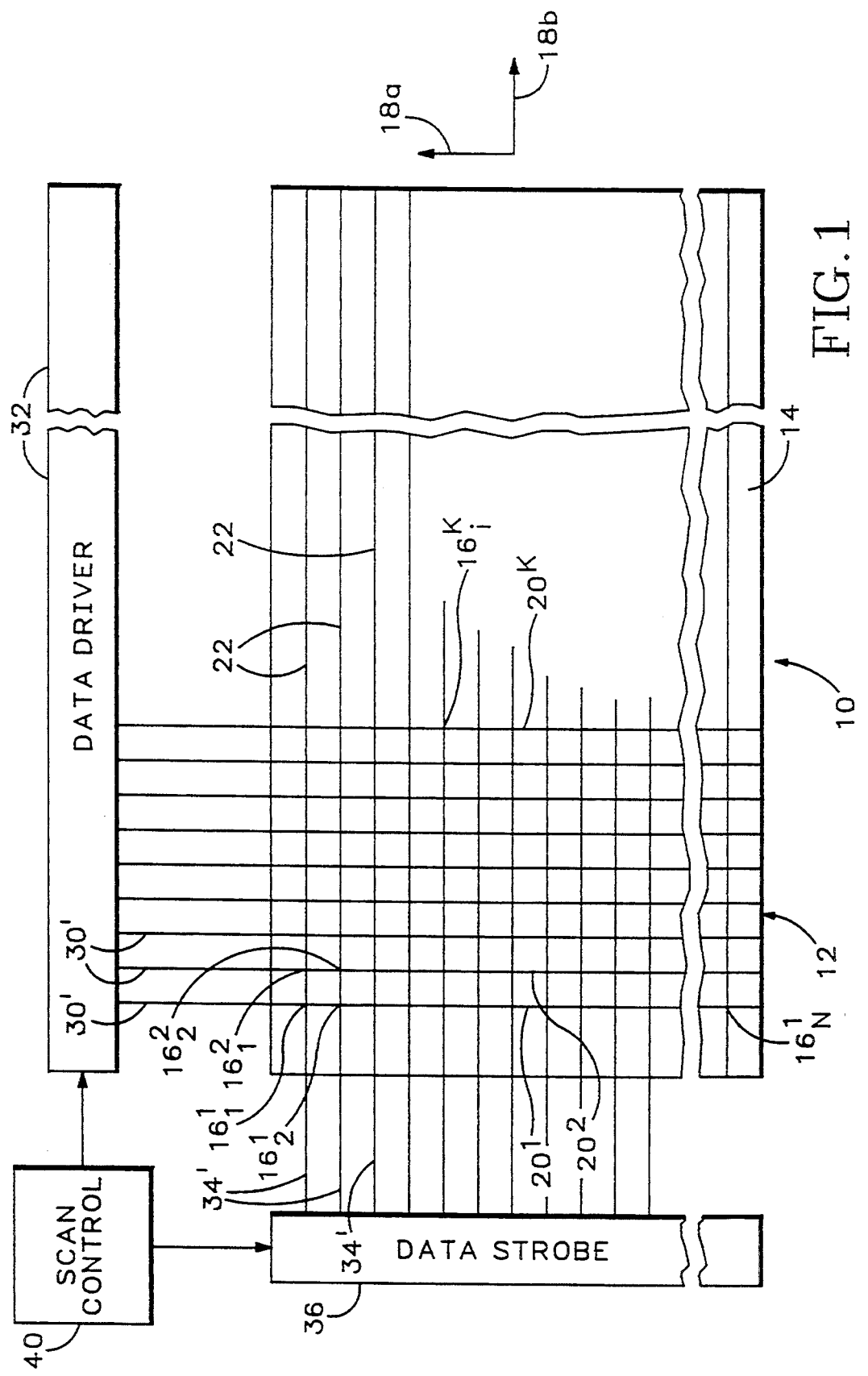
FIG. 1 is a diagram showing a frontal view of a display surface of a display panel and associated drive circuitry of a display system employing the present invention.

FIG. 1 shows a flat panel display system 10 having a display panel 12 with a display surface 14. A rectangular planar array of nominally identical data storage or display elements 16 are mutually spaced apart by predetermined distances in vertical and horizontal directions 18$a$ and 18$b$, respectively. The superscript indicates the column in which an individual display element 16$^i$ is located. To address display elements 16, display panel 12 may employ any of a variety of active matrix addressing structure elements including thin film transistors, metal-insulator-metal, or an ionizable gaseous medium, the last of which is preferred and described below.

Each display element 16 in the array represents the overlapping portions of thin, narrow data drive electrodes 20 arranged in vertical columns and elongate narrow channels 22 arranged in horizontal rows. (The electrodes 20 are hereinafter referred to as "column electrodes 20" with a superscript when necessary to identify a specific column.) The display elements 16 in each of the rows of channels 22 represent one line of information or data.

Figure 2:
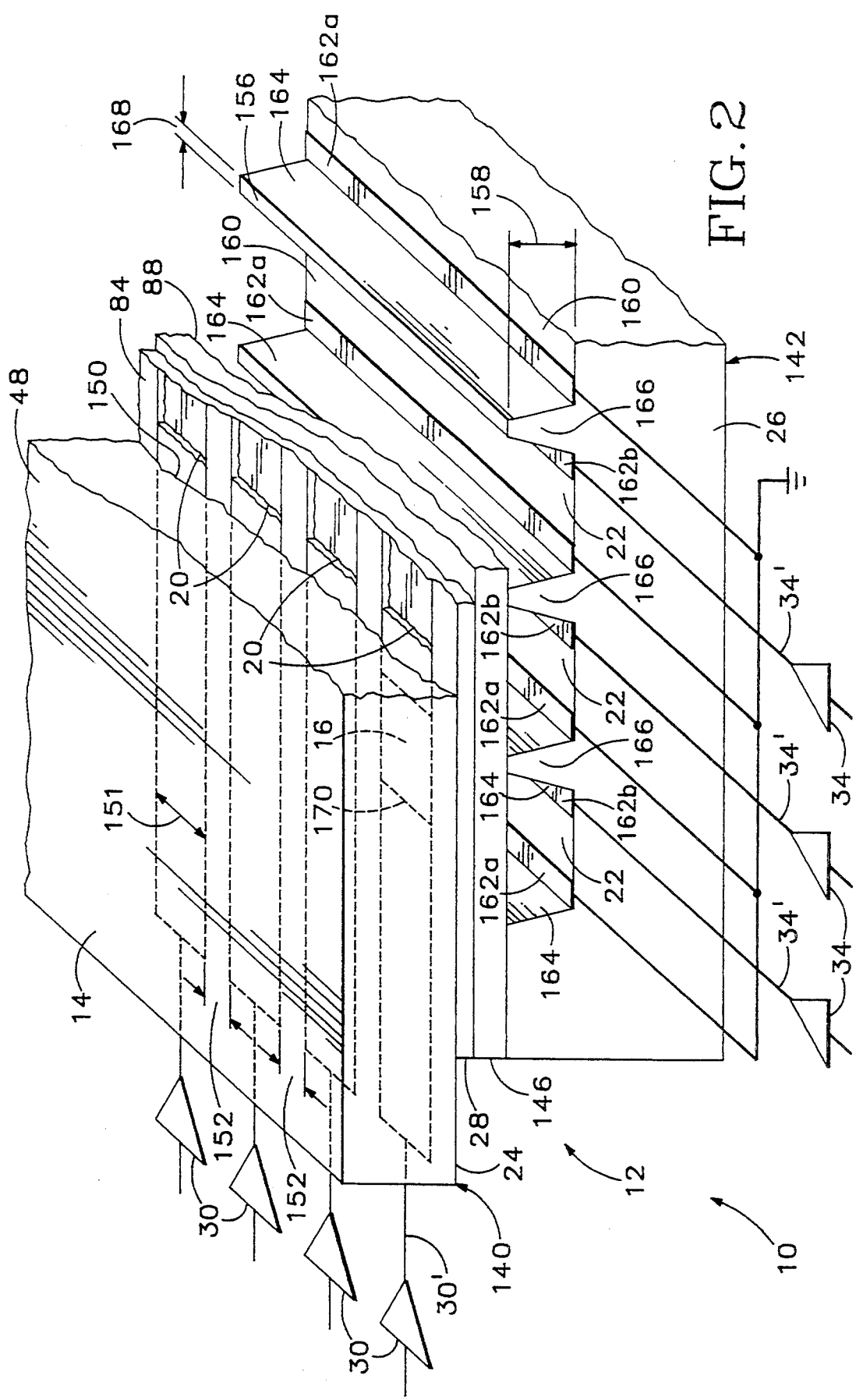
FIG. 2 is an enlarged fragmentary isometric view showing the layers of structural components forming the display panel employing the present invention as viewed from the left side of FIG. 1.

FIG. 2 shows the layers of structural components forming display panel 12. With reference to FIGS. 1 and 2, the widths of column electrodes 20 and channels 22 determine the dimensions of display elements 16, which are of rectangular shape. Column electrodes 20 are deposited on a major surface of a first electrically nonconductive, optically transparent substrate 24, and channels 22 are inscribed in a major surface of a second electrically nonconductive, optically transparent substrate 26. Skilled persons will appreciate that certain systems, such as a reflective display of either the direct view or projection type, would require that only one of the substrates be optically transparent.

A layer 28 of liquid crystal material having a relatively low dielectric anisotropy, $\Delta\epsilon$, a relatively low dielectric constant perpendicular to the director $\epsilon_\perp$, and a relatively low $\Delta n$ is captured between substrates 24 and 26. A preferred liquid crystal material has a $\Delta\epsilon$ and $\epsilon_\perp$ of less than about 5.0 and $\Delta n$ less than 0.085, and a most preferred material has a $\Delta\epsilon$ less than about 1.0, a $\epsilon_\perp$ of less than 3, and a $\Delta n$ less than 0.08. Preferred materials include nematic liquid crystal No. 91-554 SFM, manufactured by E. Merck, Darmstadt, Frankfurt, Germany, and nematic liquid crystal number 7816 from Hoffmann-La Roche Inc., Nutley, N.J. Such materials have a $\Delta\epsilon$ of approximately 0.2 and an $\epsilon_\perp$ of approximately 2.0. For comparison, prior art displays typically use a liquid crystal compound, such as nematic liquid crystal 2244 or 4718, also available from E. Merck, that have a $\Delta\epsilon$ greater than 10.0 and an $\epsilon_\perp$ of approximately 6.0 to 8.0.

Primarily because of the low $\Delta\epsilon$, such materials have relatively high threshold voltages and, therefore, do not respond optically to lower voltage cross talk signals. Because of the low $\epsilon_\perp$ and $\Delta\epsilon$, such materials achieve a dark state with a lower data drive voltage than is required to darken a display using conventional materials. Furthermore, such materials are poorer solvents than high $\Delta\epsilon$ and $\epsilon_\perp$ liquid crystal materials. The low $\Delta\epsilon$ and $\epsilon_\perp$ materials, therefore, do not leach ions from organic alignment coatings as readily as do high $\Delta\epsilon$ and $\epsilon_\perp$ materials. As a result, the low $\Delta\epsilon$ and $\epsilon_\perp$ materials have a higher resistivity and are less susceptible to the detrimental electrochemical effects of incidental direct current bias voltages than can severely degrade image quality.

Column electrodes 20 receive information in the form of data drive signals and, in a preferred embodiment, compensating signals. Both signals are of the analog voltage type and developed on parallel output conductors 30' by different ones of the output amplifiers 30 of a data driver 32. Channels 22 receive data strobe signals of the voltage pulse type developed on parallel output conductors 34' by different ones of the output amplifiers 34 of a data strobe or circuit 36. The data strobe signals cause display elements 16 along the row of channel 22 to store information related to the data drive signals on column electrode 20. To synthesize an image on substantially the entire area of display surface 14, display system 10 employs a scan control circuit 40 that coordinates the functions of data driver 32 and data strobe 36 so that all columns of display elements 16 of display panel 12 are addressed row by row in row scan fashion.

In a preferred embodiment, the PALC display is addressed using the Adaptive Drive Waveform cross talk reduction scheme described in copending U.S. patent application Ser. No. 07/958,631. Data driver 32 delivers data drive signals and a compensating signal during respective first and second phases of a row addressing period. During the first phase, column electrodes 20 receive information in the form of data drive signals of the analog voltage type and a single channel 22 receives a data strobe signal of the voltage pulse type, causing a voltage related to the data drive signals to be stored by display elements 16 in the row receiving the data strobe signal. During the second phase, all column electrodes 20 receive the same compensating signal, which has a voltage equal to the inverse, i.e., same magnitude but opposite polarity, of the weighted average of all the data drive signals delivered during the first phase.

The weighted average of the data drive signals is computed by summing the data drive signals, dividing by the number of signals, and multiplying $\delta/(1-\delta)$, where $\delta$ is the ratio of the duration of the first phase to the duration of the row address period. If the data drive and the compensating signals have equal durations, then $\delta=\frac{1}{2}$ and the value of the compensating signal is equal to the inverse of the average of the data drive signals. A small value of $\delta$ results in more effective compensation of cross talk, so $\delta$ is preferably as small as practicable. Ultimately, the size of $\delta$ is limited by the time required to set up and capture the data drive signal.

The value of the compensating signal can be determined using an analog summer circuit with resistors selected to account for unequal phase lengths of the data and compensating signals. During the first phase of the row address period when the data drive signals are applied to electrodes 20, the weighted average of the data drive signals is determined by the summer circuit and stored in a buffer. During the second phase, the inverse of the weighted average of the data drive signals is applied to all column electrodes 20. The weighted averaging could also be performed digitally, with the calculations being performed during the first phase and the inverse of the weighted average being applied during the second phase.

Analog summing typically requires less time than do digital calculations, but can suffer from interference effects resulting from the large number of closely spaced conductors. Therefore, the preferred calculation method will depend upon the application parameters, such as the size of the display and the type of addressing structure.

With reference to FIG. 2, display panel 12 includes a pair of generally parallel electrode structures 140 and 142 spaced apart by layer 28 of nematic liquid crystal material. A thin layer 146 of dielectric material, such as glass, mica, or plastic, is positioned between layer 28 and electrode structure 142. Electrode structure 140 includes glass dielectric substrate 24 that has deposited on its inner surface 150 column electrodes 20 of indium tin oxide, which is optically transparent, to form a striped pattern. Each column electrode 20 has a width 151 that defines the width of the display element 16. Adjacent pairs of column electrodes 20 are spaced apart by a distance 152, which defines the horizontal space between next adjacent display elements 16 in a row. For example, width 151 can be approximately 0.006 inch (150 $\mu$m), and distance 152 can be 0.002 inch (50 $\mu$m).

Electrode structure 142 includes glass dielectric substrate 26 into whose inner surface 156 multiple channels 22 are inscribed. Channels 22 have a depth 158 measured from inner surface 156 to a base portion 160. Each one of the channels 22 has a pair of thin, narrow metal electrodes 162a and 162b extending along base portion 160 and a pair of inner side walls 164 diverging in the direction away from base portion 160 toward inner surface 156.

Each of electrodes 162a, referred to as "reference electrodes 162a," is connected to a common electrical reference potential, which can optionally be fixed at ground potential as shown. The electrodes 162b, referred to as "data strobe electrodes" or simply "row electrodes 162b," of the channels 22 are connected to different ones of the output amplifiers 34 (of which three are shown in FIG. 2) of data strobe 36.

The side walls 164 between adjacent channels 22 define a plurality of support structures 166 with top surfaces 156 that support layer 146 of dielectric material. Adjacent channels 22 are spaced apart by the width 168 of the top portion of each support structure 166, which width 168 defines the space between next adjacent display elements 16 in a column. The overlapping regions 170 of column electrodes 20 and channels 22 define the dimensions of display elements 16, one of which is shown by dashed lines in electrodes 20. Areas between display elements 16 are masked to prevent the optical state of uncontrolled liquid crystal layer 18 in these areas from detracting from the image formed by display elements 16.

Distance 152 is typically much less than the width of column electrodes 20. The inclinations of the side walls 164 between adjacent channels 22 specify the distance 168, which is typically much less than the width of channels 22. The widths of the column electrodes 20 and the channels 22 are functions of the desired image resolution, which is specified by the display application. It is desirable to make distances 152 and 168 as small as possible. In current models of display panel 12, the channel depth 58 is one-third the channel width.

Each of channels 22 is filled with an ionizable gas, preferably one that includes helium. Layer 146 of dielectric material functions as an isolating barrier between the ionizable gas contained within channel 22 and layer 28 of liquid crystal material. The absence of dielectric layer 146 would permit either the liquid crystal material to flow into the channel 22 or the ionizable gas to contaminate the liquid crystal material. Dielectric layer 146 may be eliminated from displays that employ a solid or encapsulated electro-optical material, however.

Figure 3:
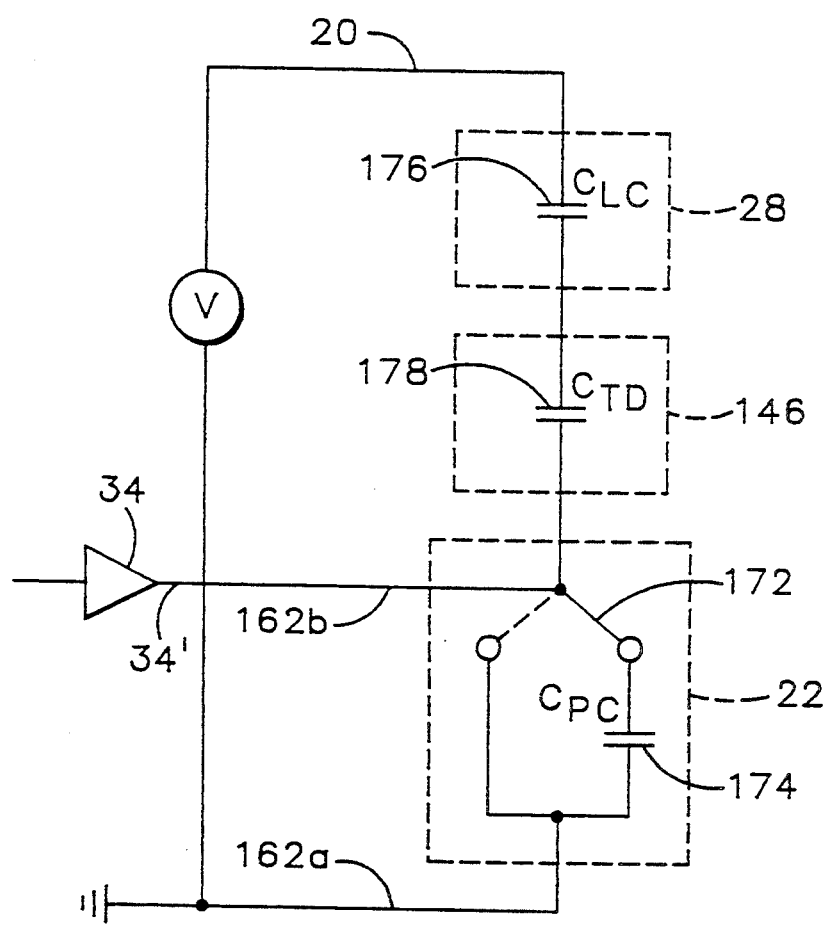
FIG. 3 is an equivalent circuit showing for a display system the capacitance of the components and the operation of the plasma as a switch for an exemplary display element of FIG. 2.

FIG. 3 is an equivalent circuit showing the electrical properties associated with typical structural components of display element 16. The ionizable gas contained within channel 22 operates as an electrical switch 172 whose contact position changes between binary switching states as a function of the voltage applied onto row electrode 162b by data strobe 36, output amplifier 34, and output conductor 34'. Switch 172 is connected between dielectric layer 146 and reference electrodes 162a. The absence of a strobe pulse allows the gas within the channels 22 to be in a nonionized, nonconducting state. Channel 22 in its nonconducting OFF state has a capacitance $C_{PC}$ and is represented as a capacitor 174. A strobe pulse applied to row electrode

162b is of a magnitude that causes the gas within the channel 22 to be in an ionized, conducting state, thereby causing the ionizable gas to operate as a conductor indicated by the dashed line of switch 172.

To store a voltage across the liquid crystal material of layer 28, a data drive signal is applied to electrode 20. When row electrode 162b is strobed, the gas contained within channel 22 beneath electrode structure 140 is ionized and provides an electrically conductive path from dielectric layer 146 to reference electrode 162a, which is typically grounded. Thus, the data drive signal is sampled by the dielectric layer 146 and liquid crystal layer 28, which are represented by capacitors 176 and 178 in series. The capacitances of the thin dielectric and the liquid crystal are represented as $C_{TD}$ and $C_{LC}$, respectively. Extinguishing the plasma acts to remove the conductive path to ground by changing the state of switch 172 and to place the OFF state capacitance $C_{PC}$ of channel 22, represented by capacitor 174, into the circuit, thereby allowing the sampled voltage to be stored across display element 16.

When the gas in channel 22 is ionized and a data drive signal is applied, the voltage $V_{DD}$ of the data drive signal is divided into a voltage $V_{LC}$ across liquid crystal layer 28 and a voltage $V_{TD}$ across the thin dielectric layer. $V_{LC}$ can be approximated as:

$$V_{LC} \approx C_{TD}/(C_{TD}+C_{LC}) \times V_{DD} \qquad \text{Eq. 1}$$

The capacitance, $C_{LC}$, of the liquid crystal material can be approximated as:

$$C_{LC} \approx (\epsilon_\perp \times A)/d + \Delta\epsilon \times f(V_{LC})/d \qquad \text{Eq. 2}$$

where "A" is the surface area of display element 16 and "d" is the thickness of layer 28. The quantity $\Delta\epsilon \times f(V_{LC})$ describes an "effective dielectric constant" for the liquid crystal material that is a function of voltage and increases as the voltage across the liquid crystal increases. Equation 1 shows that the voltage $V_{LC}$ across the liquid crystal material of layer 28 is greater for liquid crystals having a smaller capacitance, $C_{LC}$. Equation 2 shows that the capacitance of the liquid crystal is smaller for a liquid crystal having a smaller $\Delta\epsilon$, $\epsilon_\perp$, and $\Delta n$. Therefore, for a given data drive voltage $V_{DD}$, the voltage $V_{LC}$ across the liquid crystal is greater for a liquid crystal material having a smaller $\Delta\epsilon$ and $\epsilon_\perp$. Equation 2 also shows that the capacitance of the liquid crystal is inversely proportional to the thickness of layer 28. The optimum thickness of layer 28 depends upon the optical anisotropy $\Delta n$ of the liquid crystal material of layer 28. Therefore, using a liquid crystal having a low $\Delta n$ dictates the use of a thicker liquid crystal layer 28, that results in a lower capacitance $C_{LC}$ and a greater $V_{LC}$. The thickness is not sufficiently great as to affect the switching speed of liquid crystal.

Figure 4:
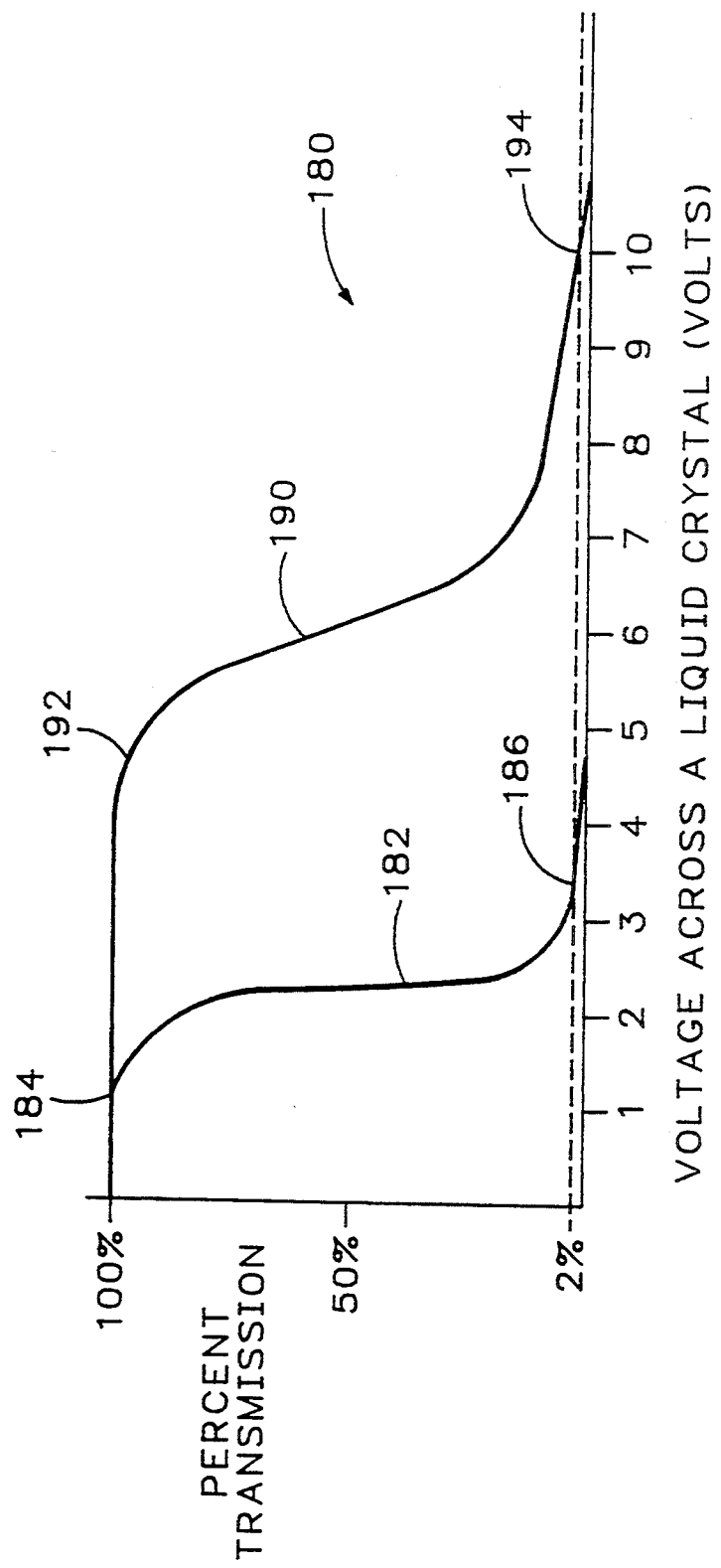
FIG. 4 is an exemplary graph showing percent transmittance plotted against voltage across the liquid crystal for conventional liquid crystal materials and liquid crystal materials used in the present invention.

FIG. 4 is a graph 180 showing qualitatively the percent transmittance of a conventional and a low $\Delta\epsilon$ and $\epsilon_\perp$ liquid crystal material plotted against voltage across the liquid crystals. The liquid crystals are in a display in which display elements 18 are 100 percent transmissive in the OFF state when no voltage is applied and less than 2 percent transmissive in the ON state when a sufficient voltage, defined as the ON voltage, is applied. The voltages of FIG. 4 are voltages that are actually across the liquid crystal, not data drive signals voltages that are divided between structural elements of the display.

A curve 182 represents the transmission versus voltage characteristics of a conventional liquid crystal material, such as nematic liquid crystals numbers 2244 and 4718 from E. Merck, typically used in thin-film transistor type display. Curve 182 shows that transmission begins to decrease from 100 percent at a threshold voltage 184 of approximately 1.3 volts. The ON, or saturation voltage, at which the transmission has decreased to 2 percent of the maximum, occurs at a voltage 186 of approximately 3.5 volts. Curve 190 represents the transmission versus voltage characteristics of typical low $\Delta\epsilon$, $\epsilon_\perp$, and $\Delta n$ material used in the present invention. A preferred material has a threshold voltage greater than 3 V, with a most preferred material having a threshold voltage greater than 4.5 V. The material whose characteristics are shown in curve 190 has a threshold voltage 192 of approximately 4.5 V and an ON or saturation voltage 194 of 10 V. Therefore, the materials of the present invention require higher voltages across the liquid crystal than do conventional materials and would, therefore, appear to require higher operating voltages.

Figure 5:
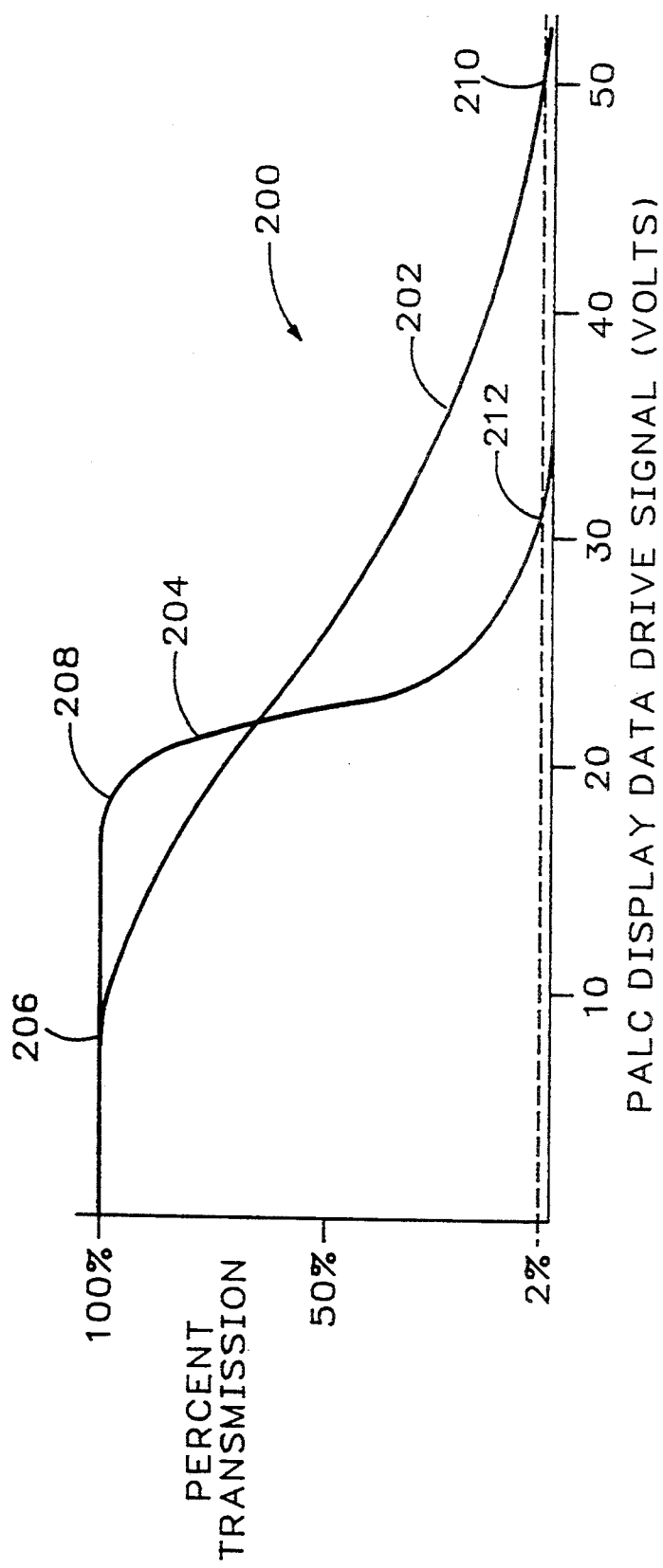
FIG. 5 is an exemplary graph showing percent transmittance plotted against the data drive voltage for an exemplary display element of FIG. 2 using a conventional liquid crystal material and a liquid crystal material of the present invention.

FIG. 5 shows that materials of the present invention actually require lower operating voltages in a PALC display. FIG. 5 is a graph 200, similar to graph 180, but plotting the percent transmittance versus the data drive voltage applied onto column electrode 20 of PALC display 10. Curves 202 and 204 represent the transmission versus voltage characteristics of a conventional liquid crystal and a low $\Delta\epsilon$, $\epsilon_\perp$, and $\Delta n$ liquid crystal, respectively. Because of the voltage divider effect of the PALC structure, a conventional liquid crystal has a threshold voltage 206 of approximately 8 V, and a typical low $\Delta\epsilon$, $\epsilon_\perp$, and $\Delta n$ liquid crystal used in the present invention has a threshold voltage 208 of approximately 18 V. The ON voltage 210, however, of the conventional liquid crystal has increased to 50 V, whereas the ON voltage 212 of the low $\Delta\epsilon$, $\epsilon_\perp$, and $\Delta n$ is only approximately 32 V. The lower ON voltage 212 of the low $\Delta\epsilon$ and $\epsilon_\perp$ results from the dependence of the PALC voltage divider effect on $\Delta\epsilon$, $\epsilon_\perp$ and $\Delta n$ and from the dependence of the liquid crystal effective dielectric constant on the voltage across the liquid crystal.

The higher threshold voltage 208 of the low $\Delta\epsilon$ and $\epsilon_\perp$ liquid crystal results in a display that is less sensitive to cross talk. Incidental voltages that are less than threshold voltage 208 do not adversely affect the image because such voltages are not sufficiently strong to change the orientation of the low $\Delta\epsilon$ and $\epsilon_\perp$ liquid crystal molecules. The lower ON or saturation voltage 212 results in a lower voltage gradient between ON and OFF pixels, thereby reducing crosstalk. The lower ON voltage 212 also reduces the required dynamic range for the data voltage drivers.

Figure 6:
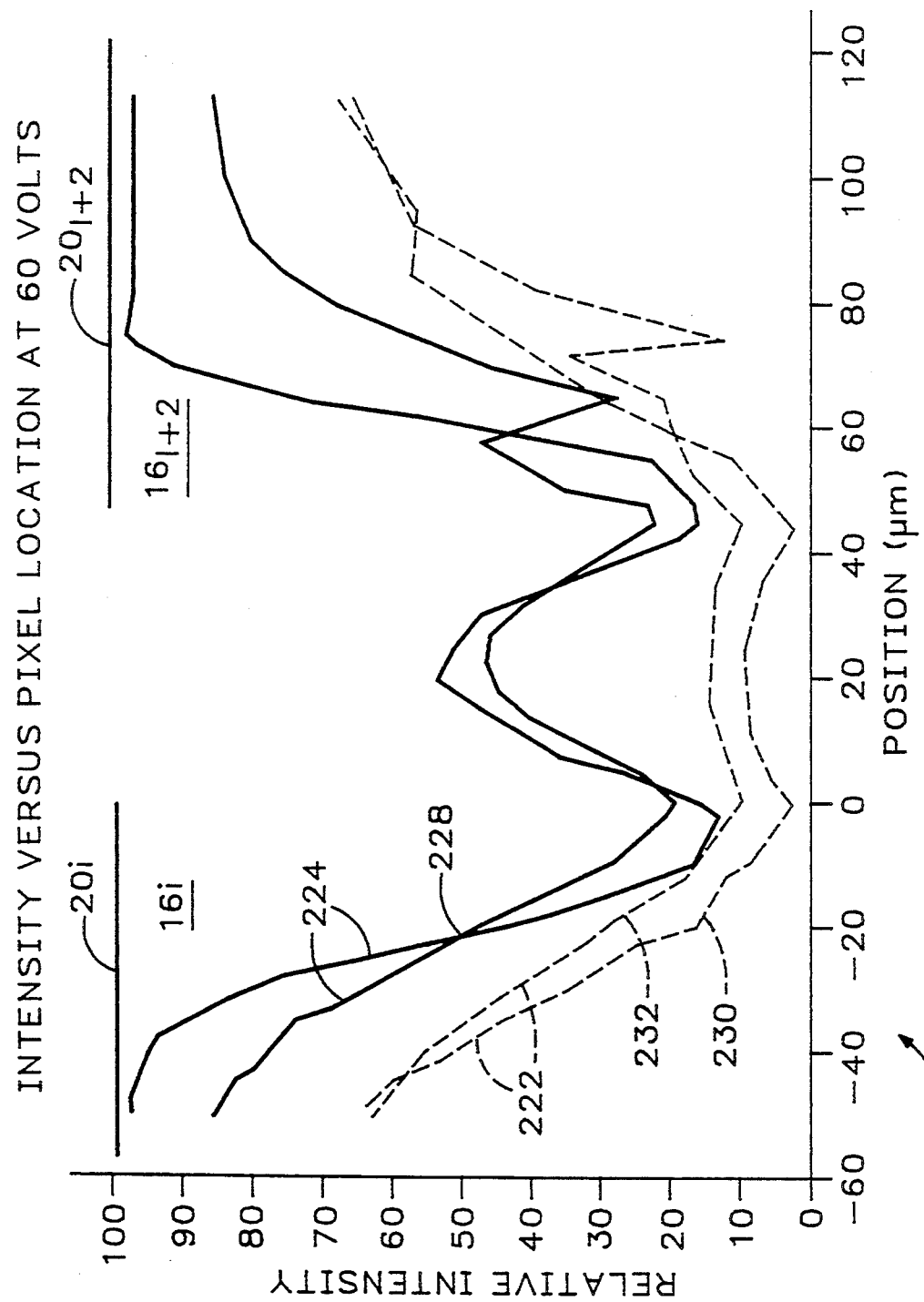
FIG. 6 is a graph of a simulation showing relative light intensity plotted against the distance from the edge of exemplary elements of FIG. 2 using conventional liquid crystal materials and liquid crystals of the present invention.

FIG. 6 is a graph 220 of a simulation using a conventional driving scheme and illustrating the optical effects of cross talk voltages. Curves 222 and 224, representing conventional and low $\Delta\epsilon$, $\epsilon_\perp$ and $\Delta n$ liquid crystal materials, respectively, show relative light intensities at the edges of two display elements, $16^i$ and $16^{i+2}$, defined by respective electrodes $20^i$ and $20^{i+2}$. Because display elements $16^i$ and $16^{i+2}$ are intended to be in a bright state, there is no voltage applied to electrodes $20^i$ and $20^{i+2}$. An ideal curve would, therefore, show the relative intensity of display elements $16^i$ and $16^{i+2}$ to be 100 percent up to the edges defined by their respective electrodes $20^i$ and $20^{i+2}$. The undesirable decrease in intensity shown by curves 222 and 224 from the 100 percent level is caused by cross talk from a simulated third electrode, $20^{i+1}$ (not shown), that is maintained in an ON state and positioned between electrodes $20^i$ and $20^{i+2}$. A comparison of curves 222 and 224 shows that the undesirable decrease in relative intensity under electrodes $20^i$ and $20^{i+2}$ is much greater for the conventional materials than for the low $\Delta\epsilon$, $\epsilon_\perp$, and $\Delta n$ material used in the present invention.

For example, at 20 μm from the edge of electrode $20^i$, the intensity 228 of the low $\Delta\epsilon$, $\epsilon_\perp$, and $\Delta n$ materials is approximately 50 percent, whereas the intensities 230 and 232 of the conventional materials are approximately 15 percent and 30 percent. The greater intensity of the low $\Delta\epsilon$, $\epsilon_\perp$, and $\Delta n$ materials under electrodes $20^i$ and $20^{i+2}$ indicates that they are unintentionally turned ON by the cross talk to a lesser extent than are the conventional materials. The shape of the curves between electrodes 224, i.e, at position 0 μm to 50 μm, is unimportant, because the area between pixels is typically masked off in a display.

Using convention materials, the relative transmission of a pixel in the OFF state changes when an adjacent pixel is turned ON from 100 percent to approximately 10 percent. Using the materials of this invention, the relative transmission drops to approximately 80 percent, a significantly lower drop. Using Adaptive Drive in combination with the materials of this invention, the relative transmission remains greater than 90 percent.

The low $\Delta\epsilon$, $\epsilon_\perp$, and $\Delta n$ materials of this invention significantly reduce the optical response of the display to cross talk voltages. When the materials of this invention are used in a display that also uses an addressing scheme that reduces the magnitude of cross talk voltages, the resulting image shows a significant overall improvement in quality.

The voltage across liquid crystal layer 28 changes somewhat as the properties of plasma channel 22 switches from those of a conductive to those of a capacitive element. The actual voltage stored across the liquid crystal itself is thus a function of the data drive signal and the capacitances of the liquid crystal layer 28, dielectric layer 146, and the plasma channel 22 in the OFF state. The stored voltages remain across layer 28 of the liquid crystal material with a negligible decrease from leakage current until voltages representing a new line of data in a subsequent image field are developed across the layer 28. The above-described addressing structure and technique provide signals of essentially 100 percent duty cycle to every one of the display elements 16.

Figure 7A:
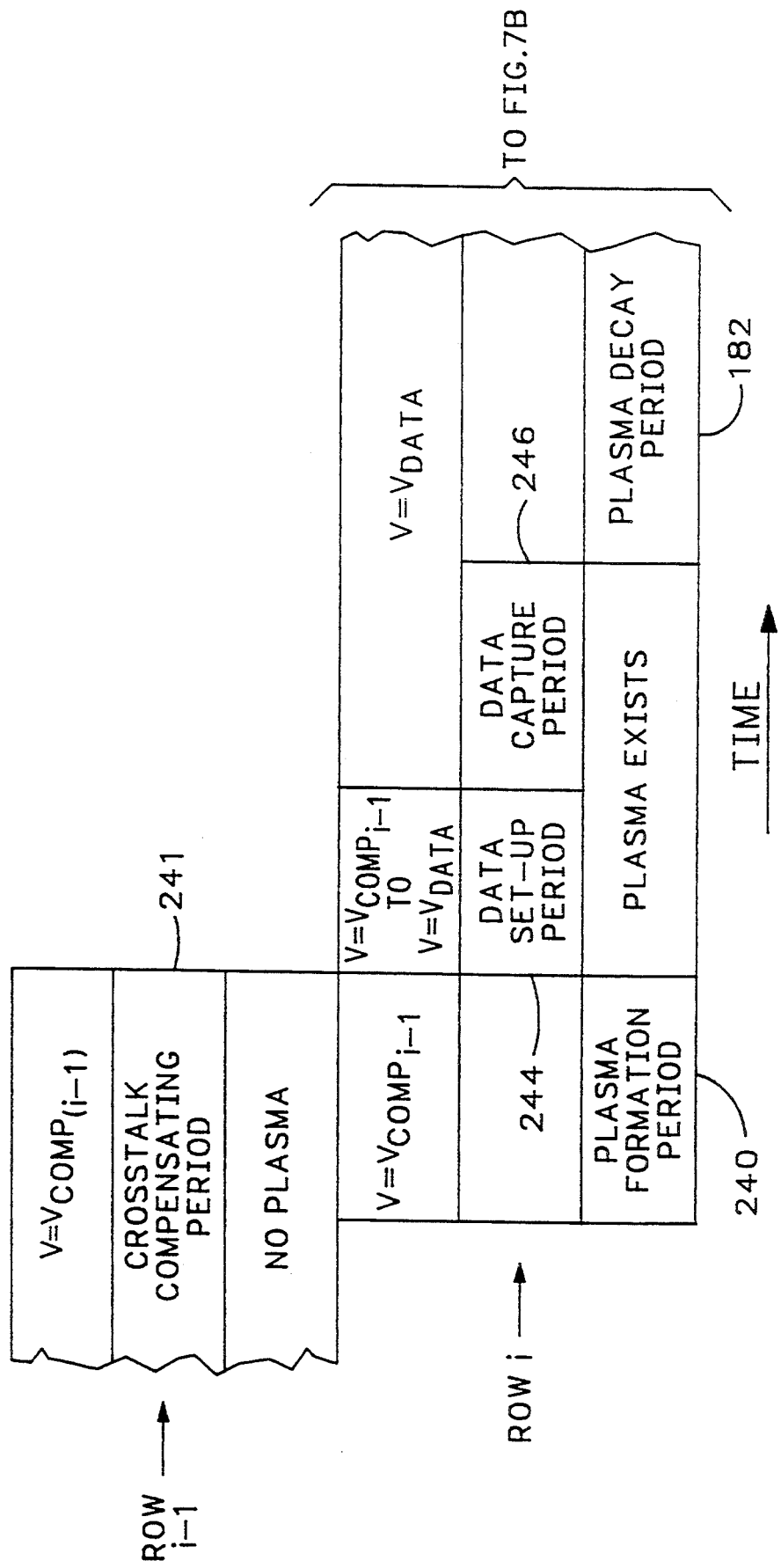
FIG. 7 is a diagram showing the various time constraints that determine the maximum number of lines of data that are addressable by a plasma addressed display embodying the present invention.
Figure 7B:
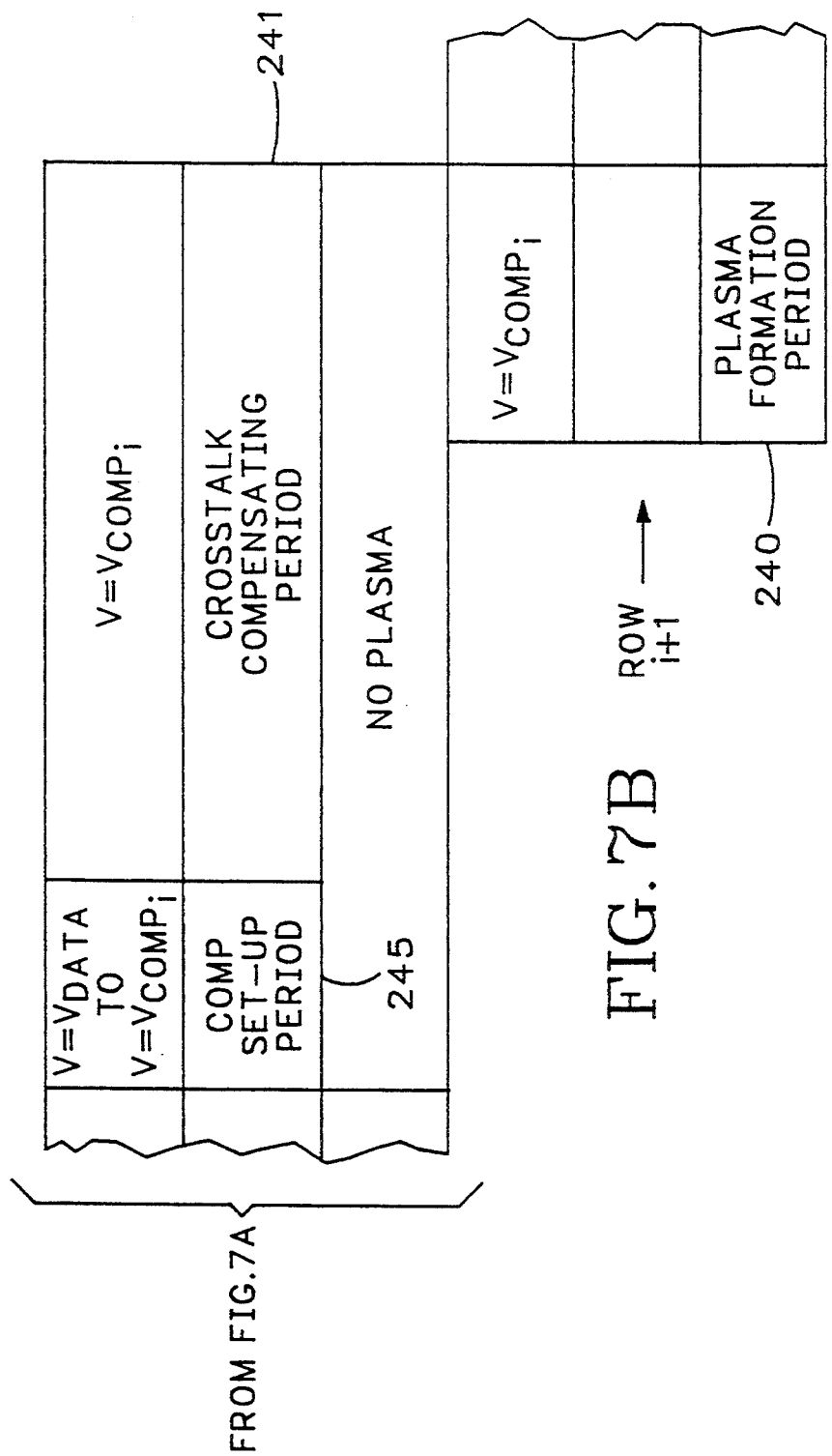

FIG. 7 is a diagram showing the various time constraints during a complete addressing period of an exemplary row i in display system 10 and part of the addressing period for a previous row i−1 and subsequent row i+1. The representation of the addressing period of each row is divided horizontally into bottom, top, and center segments. The bottom segment shows the state of the plasma in channel 22, the top segment shows the voltage applied to column electrode 20, and the center segment labels the various time periods.

The exemplary row requires a plasma formation period 240 for the plasma to form after the row electrode 162b of the strobed channel 22 receives a strobe pulse. In the preferred embodiment, the plasma formation period 240 for helium gas is nominally a few microseconds. The plasma formation period 240 begins by initiating the strobe pulse during the application of the compensating signal during a cross talk compensating period 241 for the preceding row. The plasma decay period 242 represents the time during which the plasma in channel 22 returns to a nonionized state upon the removal of a strobe pulse from row electrode 162b.

A data setup period 244 represents the time during which data driver 32 slews between the compensating signal values for the previous line and the data drive signal values of the currently strobed line and develops on output amplifiers 30 the analog data drive voltage signals that are applied to column electrodes 20. Compensating setup period 245 is similar to data setup period 244, but the data are slewing between the data drive values and the compensating values for the current line. Setup periods 244 and 245 are functions of the electronic circuitry used to implement data driver 32. A data setup period 244 of less than 1.0 microsecond is achievable.

The data capture period 246 depends on the conductivity of the ionizable gas contained within channels 22. Preferred values of operating parameters, such as gas pressure and electrical current, are those that provide the fastest data capture time 246 for positive ion current from the anode (reference electrode 162a) to the cathode (row electrode 162b). Such values will depend upon the size and shape of channels 22.

The voltage stored across liquid crystal layer 28 when the plasma is extinguished and subsequent cross talk determine the RMS voltage across layer 28. The RMS voltage across layer 28 determines the orientation of the liquid crystal molecules, which in turn determines the optical transmission properties of layer 28 and the gray level of display element 16. The voltage required for a desired gray level can be stored across liquid crystal layer 28 during the row addressing period by providing an appropriate data drive signal, since the capacitances of the liquid crystal layer 28, dielectric layer 146, and the plasma channel 22 in the ON state are fixed and known.

The cross talk depends, however, not only upon the fixed capacitive coupling among display elements 16 and data drive electrodes 20, but also upon data drive signals applied to electrodes 20 during subsequent row addressing periods. Because the values of subsequent data drive signals are unknown during the address period of a particular row, the effect of cross talk on the RMS voltage across liquid crystal layer 28 cannot be fully determined and compensated for at that time. The present invention improves the displayed image by using a liquid crystal material that is relatively insensitive to the remaining, uncompensated cross talk.

It will be obvious that many changes may be made to the above-described details of the invention without departing from the underlying principles thereof. The scope of the present invention should, therefore, be determined only by the following claims.

We claim:

1. A method of reducing sensitivity to cross talk and to direct current voltages and reducing operating voltage requirements in an electro-optical display having an addressing structure for addressing and delivering data drive signals to each of plural display elements arranged at address locations within an array during a row addressing period that defines an addressing frequency, the display elements having incidental electrical couplings that carry incidental data components having voltage values, comprising:

delivering data drive signals to display elements including a nematic liquid crystal material having a long molecular axis and characterized by an optical anisotropy less than about 0.085, a positive dielectric anisotropy less than about 5, a dielectric constant perpendicular to the long molecular axis less than about 5, and a threshold voltage in a range from about 3 volts to about 5 volts, thereby causing an image rendered on the display to be relatively unaffected by the incidental data components.

2. The method of claim 1 in which the positive dielectric anisotropy is less than about 1.

3. The method of claim 1 in which the dielectric constant perpendicular to the long molecular axis is less than about 3.0.

4. The method of claim 1 in which the optical anisotropy so less than about 0.08.

5. The method of claim 1, further comprising:
delivering compensating signals to the display elements to offset cross talk and more accurately maintain a nominal root mean square voltage value across portions of the display element during a frame addressing period.

6. The method of claim 5, in which the data drive signals are delivered on data drive electrodes to each of the display elements and in which the delivering of compensating signals comprises:
determining a compensating signal voltage value corresponding to the data drive signals applied to multiple data drive electrodes during the row address period; and
applying the compensating signal to the data drive electrodes during the row address period.

7. The method of claim 6 in which the row address period is divided into first and second phases, the information being applied to the data drive electrodes during the first phase and the compensating signal being applied during the second phase.

8. The method of claim 6 in which the step of determining a compensating signal includes determining an inverse weighted average of all of the information applied to the data drive electrodes during the row address period to the data drive electrodes.

9. In an electro-optical display having an addressing structure for addressing and delivering data drive signals on data drive electrodes to each of plural display elements arranged at address locations within an array and a data driver for delivering the data drive signals to plural address locations within the array during an addressing period, the display elements having incidental electrical couplings that carry incidental data components among the display elements, the improvement comprising:
a nematic liquid crystal material having a long molecular axis and characterized by an optical anisotropy less than about 0.085, a positive dielectric anisotropy less than about 5, a dielectric constant perpendicular to the long molecular axis less than about 5, and a threshold voltage in a range from about 3 volts to about 5 volts, thereby causing an image rendered on the display to be relatively unaffected by the incidental data components.

10. The display of claim 9 in which the positive dielectric anisotropy is less than about 1.

11. The display of claim 9 in which the optical anisotropy is less than about 0.08.

12. The display of claim 9 in which the dielectric constant perpendicular to the long molecular axis is less than about 3.0.

13. The display of claim 9 in which the display comprises an active matrix liquid crystal type.

14. The display of claim 13 in which the display comprises a plasma addressed type.

* * * * *